US012221273B2

(12) United States Patent
Nye

(10) Patent No.: US 12,221,273 B2
(45) Date of Patent: Feb. 11, 2025

(54) PACKAGING

(71) Applicant: LIFETIME PRODUCTS, INC., Clearfield, UT (US)

(72) Inventor: Troy W. Nye, Clearfield, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 0 days.

(21) Appl. No.: 17/208,967

(22) Filed: Mar. 22, 2021

(65) Prior Publication Data

US 2021/0300673 A1 Sep. 30, 2021

Related U.S. Application Data

(60) Provisional application No. 62/994,193, filed on Mar. 24, 2020.

(51) Int. Cl.

| | |
|---|---|
| ***B65D 88/00*** | (2006.01) |
| ***B31B 50/62*** | (2017.01) |
| ***B31B 110/10*** | (2017.01) |
| ***B65D 5/24*** | (2006.01) |

(Continued)

(52) U.S. Cl.

CPC ............ *B65D 88/005* (2013.01); *B31B 50/62* (2017.08); *B65D 5/0005* (2013.01); *B65D 5/241* (2013.01); *B65D 88/10* (2013.01); *B31B 2110/10* (2017.08)

(58) Field of Classification Search

CPC .... B65D 88/005; B65D 5/0005; B65D 5/241; B65D 88/10; B65D 2571/00141; B65D 2571/0066; B65D 5/242; B65D 31/10; B65D 5/3657; B65D 5/42; B31B 50/62; B65B 67/1205

USPC .... 229/101, 186, 103, 128, 181, 198.1, 189; 206/216; 383/120

See application file for complete search history.

(56) References Cited

U.S. PATENT DOCUMENTS 2,572,610 A * 10/1951 Gilbert ................... B65D 5/029 229/126

3,119,494 A * 1/1964 Rosenstiel ............. B65D 5/248 229/189

(Continued)

FOREIGN PATENT DOCUMENTS

| | | | |
|---|---|---|---|
| DE | 7618492 | U1 | 10/1976 |
| WO | 2016/054478 | A1 | 4/2016 |
| WO | 2016/0154478 | A1 | 4/2016 |

OTHER PUBLICATIONS

International Search Report and Written Opinion mailed May 27, 2021 in related PCT Application No. PCT/US2021/023663.

(Continued)

*Primary Examiner* — Christopher R Demeree

(74) *Attorney, Agent, or Firm* — Maschoff Brennan

(57) ABSTRACT

A container may include one or more walls and one or more expandable portions. For example, a container may include four walls and a first expandable portion may be movable between a collapsed position and an expanded position. The container may also include a second expandable portion that is movable between a collapsed position and an expanded position. The first and second expandable portions may allow a wall of the container to move between a first position and a second position when the first and second expandable portions are moved between the collapsed position and the expanded position.

20 Claims, 9 Drawing Sheets

(51) Int. Cl.
*B65D 5/355* (2006.01)
*B65D 88/10* (2006.01)

(56) References Cited

U.S. PATENT DOCUMENTS

| | | | | | |
|---|---|---|---|---|---|
| 3,627,541 | A * | 12/1971 | Farquhar | B65D 5/241 229/150 |
| 5,307,986 | A * | 5/1994 | Schuster | B65D 5/0005 229/101 |
| 5,495,727 | A * | 3/1996 | Strong | B65D 81/18 229/101 |
| 7,866,538 | B2 * | 1/2011 | Liao | B65D 5/0005 229/101 |
| 8,517,610 | B2 * | 8/2013 | Arcot | B65D 31/16 141/391 |
| 9,771,184 | B2 * | 9/2017 | Arcot | B65D 31/16 |
| 2002/0146955 | A1 | 10/2002 | Levine | |

OTHER PUBLICATIONS

Examination Report Mailed Oct. 26, 2022; Canadian Patent Application No. 3,113,002.

* cited by examiner

PACKAGING

CROSS-REFERENCE TO RELATED APPLICATIONS

The present application claims priority to and the benefit of U.S. Provisional Patent Application Ser. No. 62/994,193, entitled PACKAGING, filed on Mar. 24, 2020, which is hereby incorporated by reference in its entirety.

BACKGROUND

Field of the Invention

This invention generally related to packaging and, in greater detail, to packaging that may allow contents within the packaging to be easily removed.

Description of Related Art

Products are often wrapped, packed, and placed within packaging such as cardboard boxes. Cardboard boxes are frequently used because cardboard boxes may facilitate shipping and transportation. Cardboard boxes may also help protect the contents from damage because cardboard boxes may provide some cushioning and energy absorption. Single or multiple items may be disposed within a cardboard box, and cardboard boxes may allow items to be easily bundled and stowed.

Cardboard boxes are regularly used for packaging because cardboard is relatively inexpensive and may be recycled. Cardboard boxes are also often used for packaging because cardboard is lightweight and may not significantly increase shipping costs. Additionally, because cardboard boxes may be rather rigid structures, items may be securely held in place. Cardboard boxes are also commonly used for shipping because cardboard is relatively sturdy, durable, and economical to produce.

Cardboard boxes are traditionally manufactured from paper-based materials and cardboard boxes may be mass-produced. For example, cardboard boxes may be prefabricated boxes that are constructed from heavy paper-like materials such as paperboard and corrugated fiberboard. It is also known to construct cardboard boxes from recycled materials such as recycled paper.

Many cardboard boxes have standardized dimensions. For example, common cardboard box sizes are 12×12×12 inches, 18×18×18 inches, and 24×24×24 inches. Cardboard boxes may also have standard volumes, such as one (1) cubic foot, three (3) cubic feet, and six (6) cubic feet. These standard sizes may be for transportation reasons because the standard sizes may facilitate loading boxes on a shipping pallet, in a truck, on a shelf, and into a shipping container.

It is common for objects disposed in standardized cardboard boxes not to use all the available space. Accordingly, it may be necessary to fill unused space or volume with filler materials such packing papers, packing peanuts (often made from polystyrene), corrugated sheets, and packing foam. Other materials, such as bubble wrap, Styrofoam, shredded paper, and crinkle cut paper, may also be used to fill the unused space. The unused space may be filled to prevent items from moving around within the box and to prevent damage to items within the box.

Cardboard boxes may be used for shipping items from a factory to a warehouse or retailer. Items may be removed from the cardboard box for sale or, in some situations, items may be displayed for sale in the cardboard box. Labor costs may be decreased if items are displayed for sale in the cardboard box, and items may take up a limited amount of shelf-space and/or floor-space if the items remain in the box. Cardboard boxes may also facilitate purchase of items in bulk.

The size and volume of the cardboard boxes may impact shipping costs and handling operations. Because transportation costs, in particular international transportation costs, may be primarily a function of volume rather than weight, it may be desirable to use the smallest-sized cardboard box possible. Disadvantageously, it may be difficult to place items in smaller sized cardboard boxes. The smaller sized cardboard boxes may also make it more difficult to place multiple items within the box. In addition, it may be very troublesome and, in some cases, remarkably difficult to remove items from smaller sized cardboard boxes. In particular, it may be problematic to remove one or more items because the items may be tightly packed within the smaller sized cardboard box. Additionally, because there may be little or no room in the smaller sized cardboard box, adjacent items may be in contact and may interfere with removal of items from the packaging. Accordingly, items are often shipped in larger sized cardboard boxes to facilitate loading and unloading of the box. The larger sized cardboard boxes may require additional storage space and the use of more filler or packing materials.

BRIEF SUMMARY OF THE INVENTION

A need therefore exists for packaging that may eliminate or diminish one or more of the above-described disadvantages and problems.

One aspect is a container that may maximize the number of items that may be disposed in the container. For example, the container may be maximized to hold items such as tables, chairs, and the like. In an exemplary embodiment, the items may be tightly packed within the container and the container may be just large enough to allow all the items disposed within the container. In another exemplary embodiment, a certain number of items may be desired to be disposed in the container and the volume of the container may be minimized to fit the items within the container. In yet another exemplary embodiment, the number of items in the container may be maximized and the volume of the container may be minimized, which may reduce and/or eliminate unused space within the container and/or the need for filler materials to be disposed within the container.

Another aspect is a container that may be used for multiple purposes and/or functions. For example, a container may be used for shipping, transportation, and/or storage. If desired, the same container may also be used to display and/or facilitate sale of the items. For instance, items may be shipped and/or transported within the container, such as from a manufacturer or producer to a store, retailer, wholesaler, dealer, seller, etc. The same container may be used to store items. If desired, the same container may be used to display the items and/or offer the items for sale. For example, the container may be used to display items for sale, such as at a store or other type of establishment or business. Thus, the same container may be used for different purposes and/or functions.

Still another aspect is a container that may facilitate removal of items from the container. For example, the container may include one or more expandable portions and the expandable portions may allow one or more items to be quickly and/or easily removed from the container. In an exemplary embodiment, the container may include two expandable portions and the expandable portions may allow a portion of the container, such as a side and/or end of the container, to be moved away from or spaced apart from other portions of the container. The expandable portions may also allow a portion of the container, such as a side and/or end of the container, to be disposed at an angle. For example, the sides and/or ends of the container may normally be disposed in a generally vertical or upright configuration. The expandable portions may allow at least a portion of a side and/or end of the container to be disposed at an angle. For example, the expandable portions may allow a side and/or end of the container to be disposed at an angle rather than the vertical or upright position. Advantageously, the angled or spaced apart portion of the container may allow one or more items to be quickly and/or easily removed from the container. For instance, if a portion of a side and/or end of the container is angled outwardly or spaced apart from other portions of the container, that may facilitate removal of items from the container. The angled or spaced apart side and/or end of the container may also allow a plurality of items to be quickly and efficiently removed from the container.

Yet another aspect is a container that may have a first size and/or a first configuration. The container may also have a second size and/or a second configuration. In particular, the container may have a first size in the first configuration, and the container may have a second size in the second configuration. The size of the container in the first configuration may be smaller than the second size of the container in the second configuration. For instance, the first size of the container in the first configuration may have a smaller volume and/or one or more smaller dimensions than the second size of the container in the second configuration. For example, a width and/or length of the container may be smaller in the first configuration than in the second configuration. In an exemplary embodiment, the walls of the container (which may include the sides and/or ends) in the first configuration may be disposed in generally upright or vertical positions, and the walls may be disposed at generally right angles or about 90° angles. Thus, in an exemplary embodiment, the container may have a generally square or rectangular shape in the first configuration. In the second configuration, at least a portion of a wall may extend or be angled outwardly. That is, in the second configuration, at least a portion of a wall may be spaced apart and/or disposed at an angle. Therefore, in the second configuration, the container may have a second size and the second size may be larger than then first size. The container may be disposed in a first configuration and the container may have a first size when, for example, one or more items are being loaded into the container. The container may also be disposed in the first configuration and the container may have the first size when the container is being used for shipping and/or transport. In addition, the container may be disposed in the first configuration and the container may have the first size when the container is being used for purposes such as storage. The container may be disposed in the second configuration and/or the container may have the second size after delivery to a store or merchant. The second size may allow items to be quickly and easily removed from the container.

Still yet another aspect is a container that may be specifically designed to maximize the number of items that may be disposed within the container and/or limit the amount of unused space or volume within the container, which may limit or eliminate the need for filler materials to be disposed within the container. Thus, the volume and/or size of the container may be minimized, which may reduce shipping costs and/or facilitate transport of the container. The container may also be sized and configured to facilitate tight packing of the items within the container and portions of the items may contact, nest, overlap, and the like. The container may have a second size and the second size may allow items to be easily removed from the container. Therefore, in an exemplary embodiment, one or more items may be tightly packed within the container when the container has a first size and/or is disposed in a first configuration. The container may have a second size and/or second configuration, which is larger than the first size and/or first configuration. The second size and/or second configuration may allow one or more items to be quickly and efficiently removed from the container.

A further aspect is a container may have a standard size in first configuration, which may facilitate shipping, transport, and/or storage of the container. Because the container may have a larger size in the second configuration, items may be more easily removed from the container. This may allow, for example, items to be tightly packed when the container is in the first configuration. The tightly packed items, however, may be easily removed from the container in the second configuration because the second configuration may have a larger size. Thus, the container may have a smaller size in the first configuration for purposes such as shipping, transportation, and/or storage, and a larger size in the second configuration for purposes such as unloading, display, and/or sales.

Another further aspect is a container may include one or more expandable portions and the expandable portions may allow the size of the container to be increased. For example, one or more corners of the container may include expandable portions and the expandable portions may allow at least a portion of the container to be expanded in size. In an exemplary embodiment, a first corner may have an expandable portion and a second corner may have an expandable portion. The expandable portions may allow at least a portion of a side and/or end of the container to move from a first position to a second position. For instance, the expandable portions may allow a portion of the container, such as a front wall, sidewall, and/or end wall, to be angled, slanted, tilted, etc. In particular, the expandable portions may allow at least a portion of the container to extend and/or be angled outwardly. Therefore, the expandable portions may facilitate removal of items from the container. The expandable portions may also allow at least a portion of the container to be moved away and/or spaced apart from other portions of the container, such as the front wall, sidewall, and/or end wall. The expandable portions may allow the container to have a first size in a first configuration and a second size in the second configuration.

Still yet another further aspect is a container that may include one or more expandable portions and the expandable portions may include one or more folded portions. In an exemplary embodiment, the container may include one or more folded portions and the folded portions may allow the size of the container to be increased. For example, when the expandable portions are in the folded configuration, the container may have a first size. When the expandable portions are in the unfolded configuration, the container may have a second size. The folded portions may be formed by a portion of the container, such as a wall of the container. In particular, the folded portions may be formed by a portion of an outer wall of the container. Advantageously, the expandable portions, such as the folded portions, may be integrally formed with the container as part of a unitary, one-piece structure.

A further aspect is a container that may be constructed from paper-based materials such as paper, paperboard, fiberboard, and the like. The container may also be constructed from corrugated materials such as corrugated paperboard, corrugated cardboard, corrugated fiberboard, and the like. It will be understood that the container may be constructed from other suitable materials including synthetic materials such as plastic, natural packing materials such as plant-based materials, metals, and the like. It will also be understood that the container may be referred to by other wording such as a shipping container, box, cardboard box, carton, case, etc.

Another aspect is a container that may movable between a first configuration and a second configuration. The first configuration may be sized and configured to retain one or more items within the container, and the second configuration may be sized and configured to facilitate removal of one or more items from the container. The first configuration may have a smaller size than the second configuration. The container may include a first outer wall, a second outer wall, a first corner disposed at least proximate an intersection of the first outer wall and the second outer wall, and a first expandable portion disposed in the first corner. The first expandable portion may be movable between a collapsed position and an expanded position. The first expandable portion may include a first portion integrally connected to the first outer wall, and a second portion may be integrally connected to the second outer wall. A first surface of the first portion may abut a first surface of the second portion when the first expandable portion is disposed in a collapsed position, and the first surface of the first portion may be spaced apart from the first surface of the second portion when the first expandable portion is disposed in the expended position. The first expandable portion may allow the first outer wall of the container to move from a first position to a second position when the first expandable portion moves from the collapsed position to the expanded position.

In one or more exemplary embodiments, the first expandable portion may be disposed at least adjacent to an inner surface of the second outer wall when the first expandable portion is disposed in the collapsed position. The first outer wall may be disposed in a generally vertical configuration when the first expandable portion is in the collapsed position, and the first outer wall may be disposed at an outwardly extending angle when the first expandable portion is in the extended position. An upper portion of the first outer wall may be disposed at least adjacent to an upper portion of the second outer wall when the first expandable portion is in the collapsed position, and the upper portion of the first outer wall may be spaced apart from the upper portion of the second outer wall when the first expandable portion is in the extended position. The first outer wall, the second outer wall, and the first expandable portion may be integrally formed as part of a unitary, one-piece structure. The first portion of the first expandable portion may be at least partially constructed from the first outer wall, and the second portion of the first expandable portion may be at least partially constructed from the second outer wall. The first portion of the first expandable portion may be at least partially constructed from the first outer wall, and the second portion of the first expandable portion may be at least partially constructed from the first outer wall. The first portion of the first expandable portion may be at least partially constructed from the second outer wall, and the second portion of the first expandable portion may be at least partially constructed from the second outer wall.

In an exemplary embodiment, the container may include a first piece of tape attached to the first outer wall and the second outer wall, and the first piece of tape may extend around the first corner. A second piece of tape may be attached to the first outer wall and the second outer wall, and the second piece of tape may extend around the first corner. When the first piece of tape is cut, the first expandable portion may move from the collapsed position to the extended position. The second piece of tape may remain uncut when the first expandable portion moves from the collapsed position to the extended position.

In another exemplary embodiment, the container may include a first piece of tape attached to the first outer wall and the second outer wall, and the first piece of tape may extend around the first corner. A second piece of tape may be attached to the first outer wall and the second outer wall, and the second piece of tape may extend around the first corner. A third piece of tape may be attached to the first outer wall and the second outer wall, and the third piece of tape extending around the first corner. When the first piece of tape and/or the second piece of tape is cut, the first expandable portion may move from the collapsed position to the extended position. The third piece of tape may remain uncut when the first expandable portion moves from the collapsed position to the extended position.

In a further exemplary embodiment, the first portion of the first expandable portion and the second portion of the first expandable portion may comprise a portion the first outer wall folded onto itself. In a still further exemplary embodiment, the first portion of the first expandable portion and the second portion of the first expandable portion may comprise a portion the second outer wall folded onto itself.

In still a further exemplary embodiment, the container may include a third outer wall, a second corner disposed at least proximate an intersection of the first outer wall and the third outer wall, and a second expandable portion disposed in the second corner, the second expandable portion may be movable between a collapsed position and an expanded position. The second expandable portion may include a first portion integrally connected to the first outer wall, a second portion integrally connected to the third outer wall, and a first surface of the first portion may abut a first surface of the second portion when the second expandable portion is disposed in a collapsed position, the first surface of the first portion may be spaced apart from the first surface of the second portion when the second expandable portion is disposed in the expended position. The second expandable portion may allow the first outer wall of the container to move from the first position to the second position when the second expandable portion moves from the collapsed position to the expanded position.

Another aspect is a method of constructing a container that may be movable between a first configuration and a second configuration. The first configuration may be sized and configured retain one or more items within the container. The second configuration may be sized and configured to facilitate removal of one or more items from the container. The first configuration may have a smaller size than the second configuration. The method may include providing a first outer wall, providing a second outer wall, disposing a first corner at least proximate an intersection of the first outer wall and the second outer wall, and forming a first expandable portion in the first corner. The first expandable portion may be movable between a collapsed position and an expanded position. The first expandable portion may include a first portion integrally connected to the first outer wall, and a second portion integrally connected to the second outer wall. A first surface of the first portion may abut a first surface of the second portion when the first expandable portion is disposed in a collapsed position, and the first surface of the first portion may be spaced apart from the first surface of the second portion when the first expandable portion is disposed in the expended position. The first expandable portion may allow the first outer wall to move from a first position to a second position when the first expandable portion moves from the collapsed position to the expanded position. The method may also include attaching a first piece of tape to the first outer wall and the second outer wall, the first piece of tape may extend around the first corner; and attaching a second piece of tape to the first outer wall and the second outer wall, the second piece of tape may extend around the first corner. When the first piece of tape is cut, the first expandable portion may move from the collapsed position to the extended position. The second piece of tape may remain uncut when the first expandable portion moves from the collapsed position to the extended position. The method may also include attaching a first piece of tape to the first outer wall and the second outer wall, the first piece of tape may extend around the first corner; attaching a second piece of tape to the first outer wall and the second outer wall, the second piece of tape may extend around the first corner; and attaching a third piece of tape to the first outer wall and the second outer wall, the third piece of tape may extend around the first corner. When the first piece of tape and/or the second piece of tape is cut, the first expandable portion may move from the collapsed position to the extended position. The third piece of tape may remain uncut when the first expandable portion moves from the collapsed position to the extended position.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages, and features of the present disclosure. It will be appreciated that these drawings depict only exemplary embodiments and are not intended to limit its scope. Additionally, it will be appreciated that while the drawings may illustrate exemplary sizes, scales, relationships, and configurations, the drawings are not intended to limit the scope of the claimed invention. The drawings may be to scale and representative of exemplary embodiments, but are not necessarily to scale. The invention will be described and explained with additional specificity and detail through the use of the accompanying drawings in which:

DETAILED DESCRIPTION

Figure 1A:
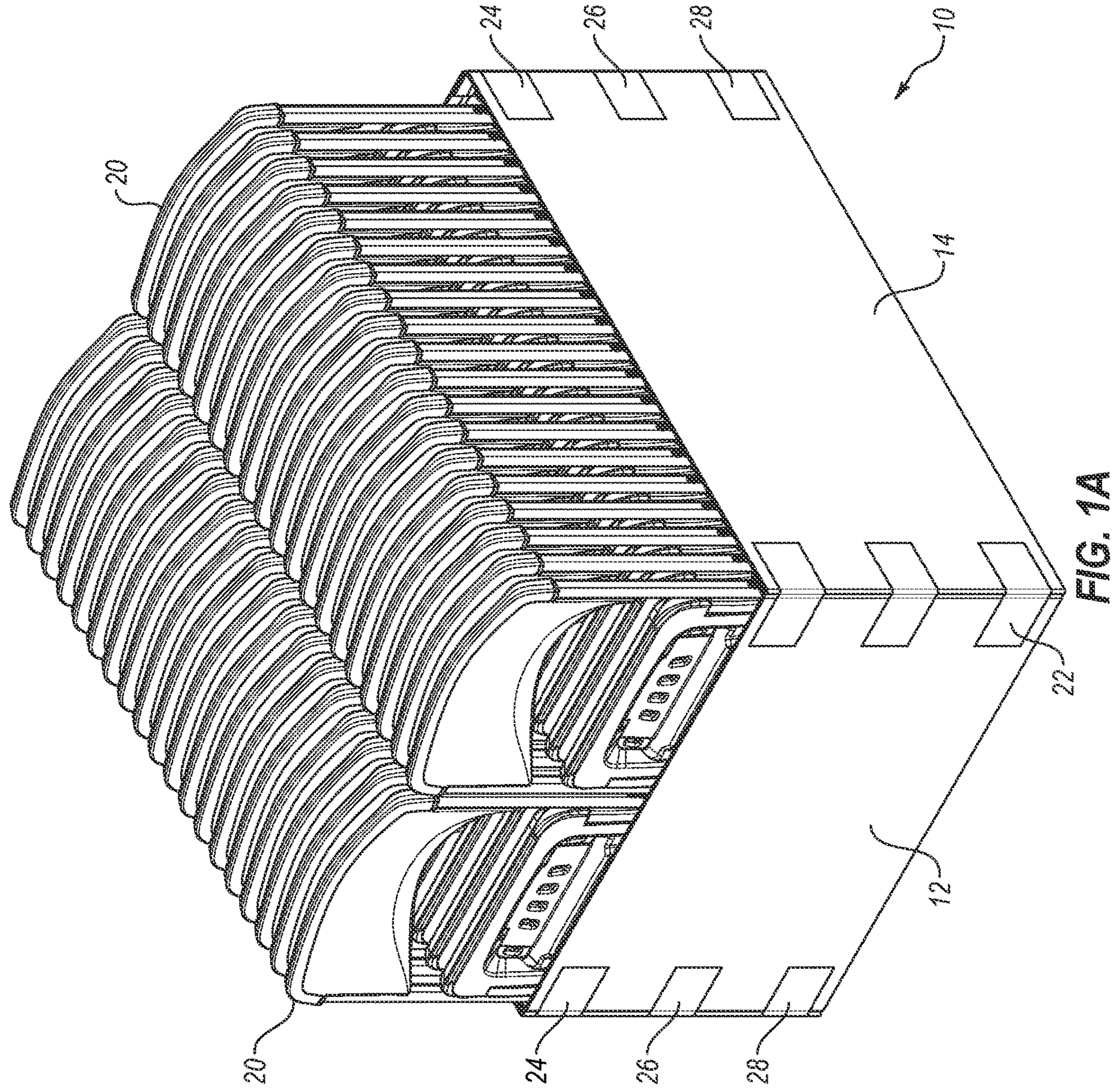
FIG. 1A is an upper perspective view of an exemplary container with a plurality of exemplary chairs disposed in the container, illustrating the container in a first position and/or a first configuration, such as a shipping, transport, and/or storage position and/or configuration.

This disclosure is generally directed towards a container, which may be a shipping container, box, cardboard box, carton, case, and the like. The principles of the present invention, however, are not limited to a container. It will be understood that, in light of the present disclosure, the container may have a variety of suitable shapes, sizes, configurations, and/or arrangements, and the container may be successfully used for different purposes and functions.

The container may be constructed from various suitable materials such as paper-based materials including paper, paperboard, fiberboard, and the like. The container may also be constructed from corrugated materials such as corrugated paperboard, corrugated cardboard, corrugated fiberboard, corrugated cardboard boxes, etc. Additionally, the container may be constructed from other materials with appropriate properties and characteristics, including synthetic materials such as plastics, natural materials such as plant-based materials, metals such as aluminum, and the like. After reviewing this disclosure, one of ordinately skill in the art will appreciate that the container may be constructed from various suitable materials, and the container does not have to be constructed from paper-based materials and/or corrugated materials.

The container may be referred to by other names such as a box, shipment box, shipping box, cardboard box, carton, package, packaging, packet, case, etc. The container may be sized and configured to hold a single item or multiple items. Advantageously, the container may allow one or more items to be conveniently shipped, transported, stored, displayed, and/or removed from the packaging. Beneficially, the items may be easily and conveniently removed from the container by a buyer, seller, retailer, vendor, consumer, purchaser, and the like. In addition, the container may allow one or more items to be shipped, transported, stored, displayed, and/or sold without excess volume or wasted space in the container, which may decrease shipping costs and/or facilitate more efficient use of space by the manufacturer, shipper, retailer, vendor, etc.

The container may be sized and configured to at least partially contain one or more items. As discussed in connection with the exemplary embodiments below, the container may be sized and configured to contain one or more items such as chairs. One of ordinary skill in the art will appreciate after reviewing this disclosure that the container may be used in connection with a variety of suitable items such as tables, benches, stands, sheds, storage boxes, sporting equipment, furniture, etc. One of ordinary skill in the art will also appreciate after reviewing this disclosure that the container may be used in connection with other types of goods, products, furnishing, items, devices, merchandise, and the like.

To assist in the description of the container, and various parts and components of the container, words such as top, bottom, front, rear, right, and left may be used to describe the accompanying figures. It will be appreciated, however, that the container and its parts and components can be disposed in a variety of desired positions, including various angles, sideways and even upside down.

It will also be appreciated that the singular forms “a”, “an”, and “the” may include plural forms as well, depending, for example, upon context. It will be further appreciated that the terms “comprises”, “comprising”, “including”, and “having” may be inclusive and may specify the presence of stated features, steps, operations, elements, and/or components, but do not preclude the presence or addition of one or more other features, steps, operations, elements, components, and/or groups thereof. In addition, the wording “and/or” can include any and all combinations of one or more of the associated and/or listed items.

Spatially relative terms, such as “inner”, “outer”, “beneath”, “below”, “lower”, “above”, “upper”, and the like, may be used for convenience and to describe one or more elements, and/or a relationship to another element(s) or feature(s). Spatially relative terms may be intended to encompass other orientations of the device in addition to the orientation depicted in the figures. For example, if the device in the figures is turned over, elements described as “below” or “beneath” other elements or features may then be oriented “above” the other elements or features. Thus, the example term “below” could encompass both an orientation of above and below. The device may be otherwise oriented (e.g., rotated 90 degrees or at other orientations) and the spatially relative descriptors may be interpreted accordingly. It will be understood that phrases such as “between X and Y” may be interpreted to include X and Y. And phrases such as “from X to Y” may be interpreted to include X and Y.

It will also be understood that wording such as “on”, “attached”, “connected”, etc. may indicate one or more elements are directly on, attached, or connected, and/or one or more intervening elements may also be present. In contrast, when an element is referred to as being, for example, “directly attached to” another element, no intervening elements may be present. It will further be understood that references to a structure or feature that is disposed “adjacent” to another structure or feature may or may not have portions that touch, overlap, or underlie the adjacent feature.

In addition, it will be understood that wording such as “first”, “second”, etc. may be used to describe various elements, but these elements should not necessarily be limited by these terms. For example, these terms may be used to distinguish one element from another. Thus, a “first” element could also be termed a “second” element without departing from the teachings of the present disclosure. Additionally, a sequence or process, such as one or more steps, may not be limited to the specific order listed depending upon context. Further, the disclosure may include any number of features, aspects, advantages, and the like, in any combination, and one or more of the features, aspects, advantages, and the like may not be present, needed, or required, The present disclosure could also include one or more additional features, aspects, advantages, and the like depending, for example, upon the intended use of the container.

The drawings may be diagrammatic, schematic, and other representations of example embodiments, and may not be intended to limit the present disclosure. Moreover, while various drawings may be provided to scale, and in exemplary arrangements and/or configurations, the drawings are not necessarily drawn to scale and the various embodiments may have other suitable shapes, sizes, arrangements, and/or configurations. Thus, the proportionality, scale, size, shape, form, function, arrangement, configuration, and/or other features of the disclosed embodiments may be altered without necessarily departing from the scope of this disclosure.

In the exemplary embodiments illustrated in the figures, like structures may be provided with similar reference designations for convenience and readability. It will be understood that no limitation of the scope of the disclosure may be intended. It will also be understood that the language used to describe the exemplary embodiments is illustrative only and is not to be construed as limiting the scope of the disclosure.

As seen in FIG. 1, an exemplary embodiment of a container 10 may have a generally rectangular configuration with four sides and/or walls. For convenience, the sides and/or walls may be referred to as a front wall or side 12, a right side or wall 14, a rear wall or side 16, and a left side or wall 18. The sides and/or walls may also be referred to as ends and/or sidewalls. For example, the front wall 12 may also be referred to as the front end, the right side 14 may be referred to as a sidewall, the rear wall 16 may be referred to as the rear end, and the left side 18 may be referred to as a sidewall. It will be understood that the container 10 may include a bottom, base, underside, and/or floor, such as shown in FIGS. 2A and 2B. The container 10 may also include an upper portion such as a top, lid, and/or cover. After reviewing this disclosure, one of ordinary skill in the art will appreciate that the container 10 can include any suitable number of sides, walls, ends, etc. depending, for example, upon the intended use of the container. The container 10 may also have other appreciate shapes, sizes, configurations, and/or arrangements depending, for example, upon the items intended to be disposed inside the container 10.

The container 10 may be opened to provide access to an interior of the container. For example, the upper portion of the container 10 may be opened. In particular, the upper portion of the container 10 may include a top, lid, cover, etc., and at least a portion of the upper portion may be opened and/or removed. For instance, in an exemplary embodiment shown in the accompanying figures, the container 10 may include an upper portion and the upper portion may be removed. The removable upper portion may facilitate use of the container 10. For instance, the upper portion may be attached to the container 10 during shipping, transport, and/or storage. At least a portion of the upper portion may be removed to provide access to the inside of the container 10. As shown in the accompanying figures, the entire upper portion of the container 10 may be removed. It will be appreciated that the entire upper portion of the container 10 does not have to be removed. As discussed below, when at least a portion of the upper portion of the container 10 is opened and/or removed, one or more items inside the container can be displayed and/or one or more items may be removed from the container. One of ordinary skill in the art will appreciate after reviewing this disclosure that the upper portion may not be required and any suitable portions of the container 10 may be opened and/or removed.

Figure 1B:
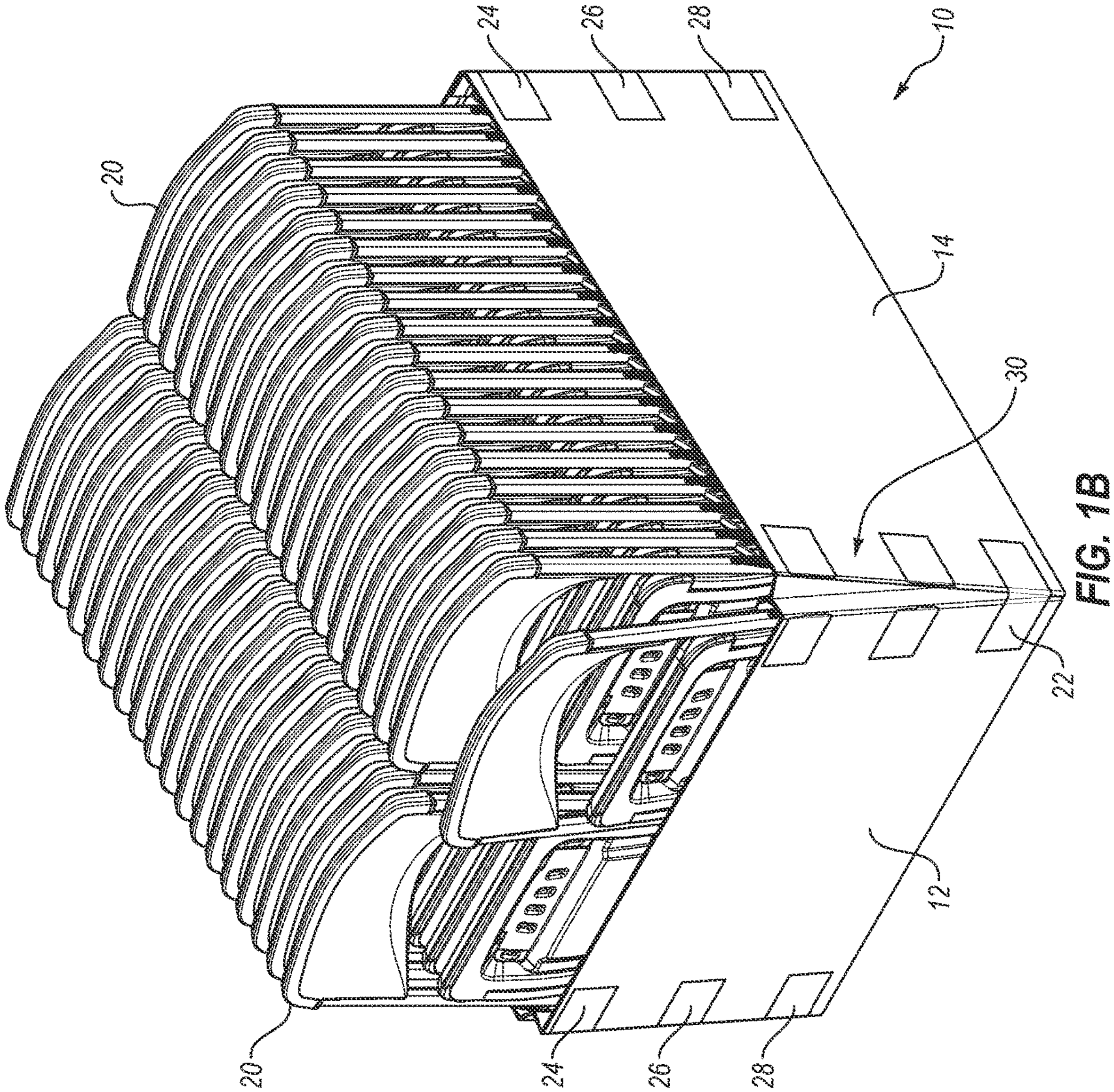
FIG. 1B is another upper perspective view of the exemplary container and the exemplary chairs shown in FIG. 1A, illustrating the container in a second position and/or second configuration, such as a use, display, and/or unloading position and/or configuration.
Figure 1C:
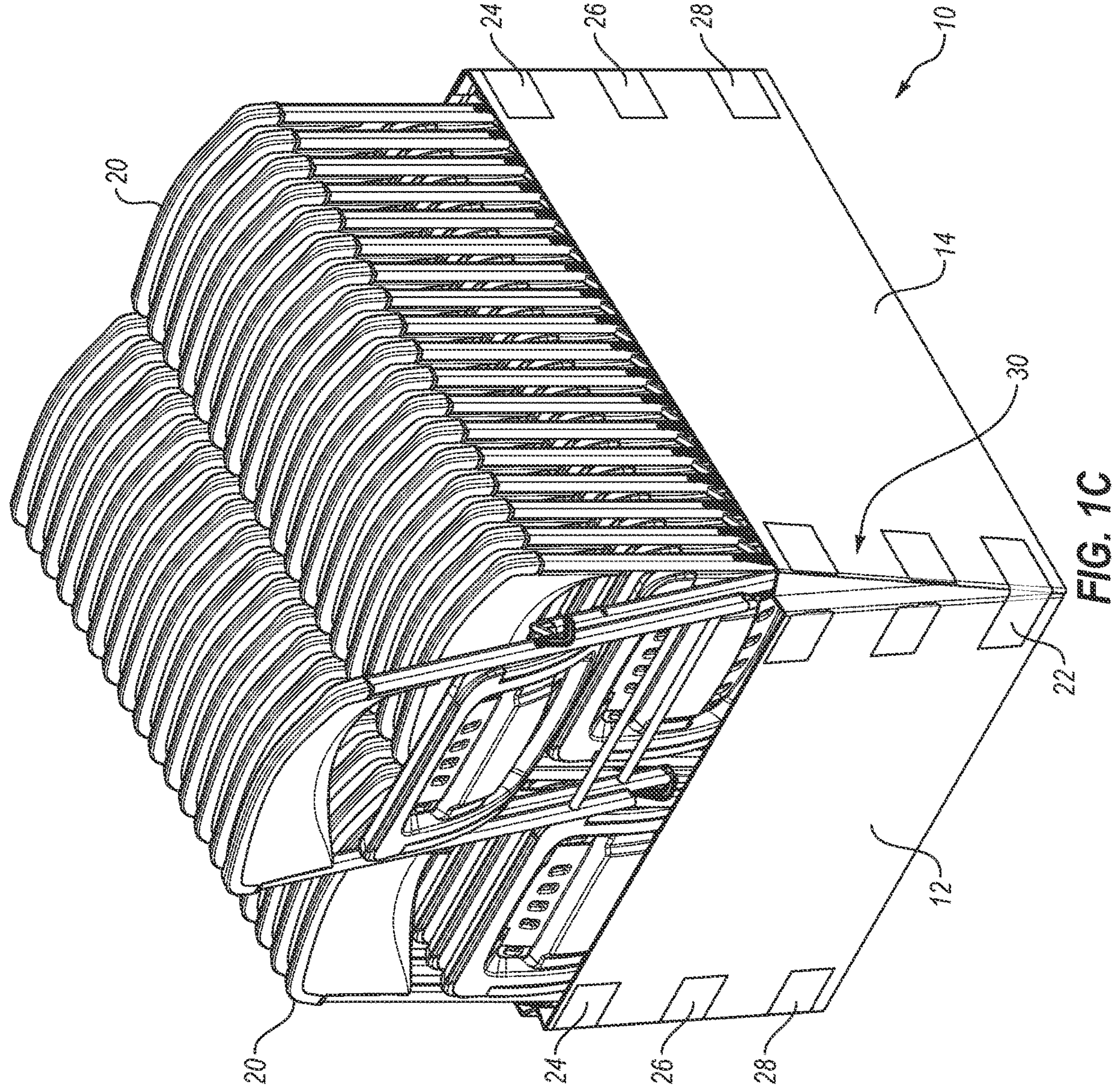
FIG. 1C is another upper perspective view the exemplary container and the exemplary chairs shown in FIG. 1A, illustrating the container in the second position and/or second configuration, and illustrating an exemplary chair being removed from the container.
Figure 2A:
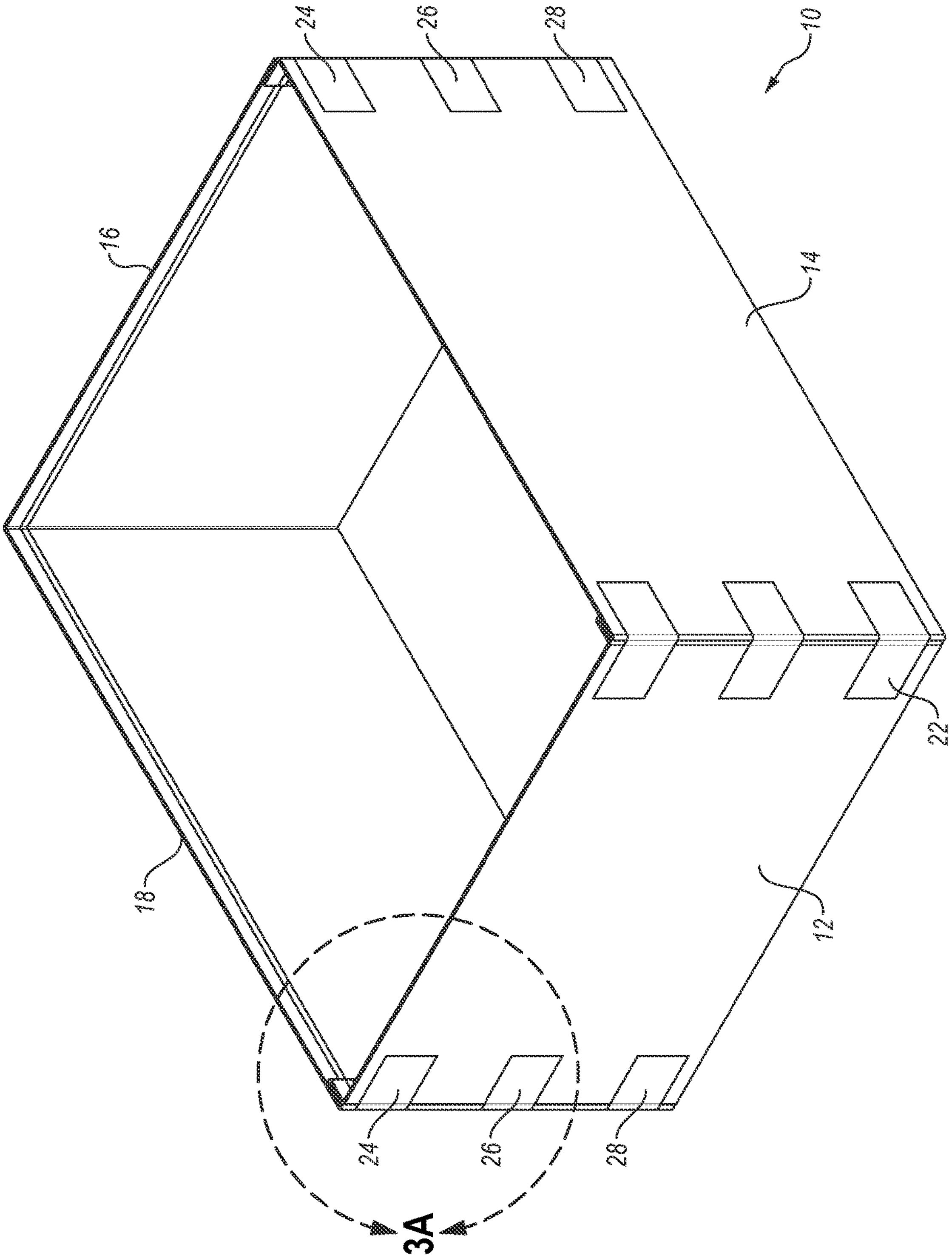
FIG. 2A is an upper perspective view of an exemplary container, illustrating the container in a first position and/or first configuration, such as a shipping, transport, and/or storage position.
Figure 2B:
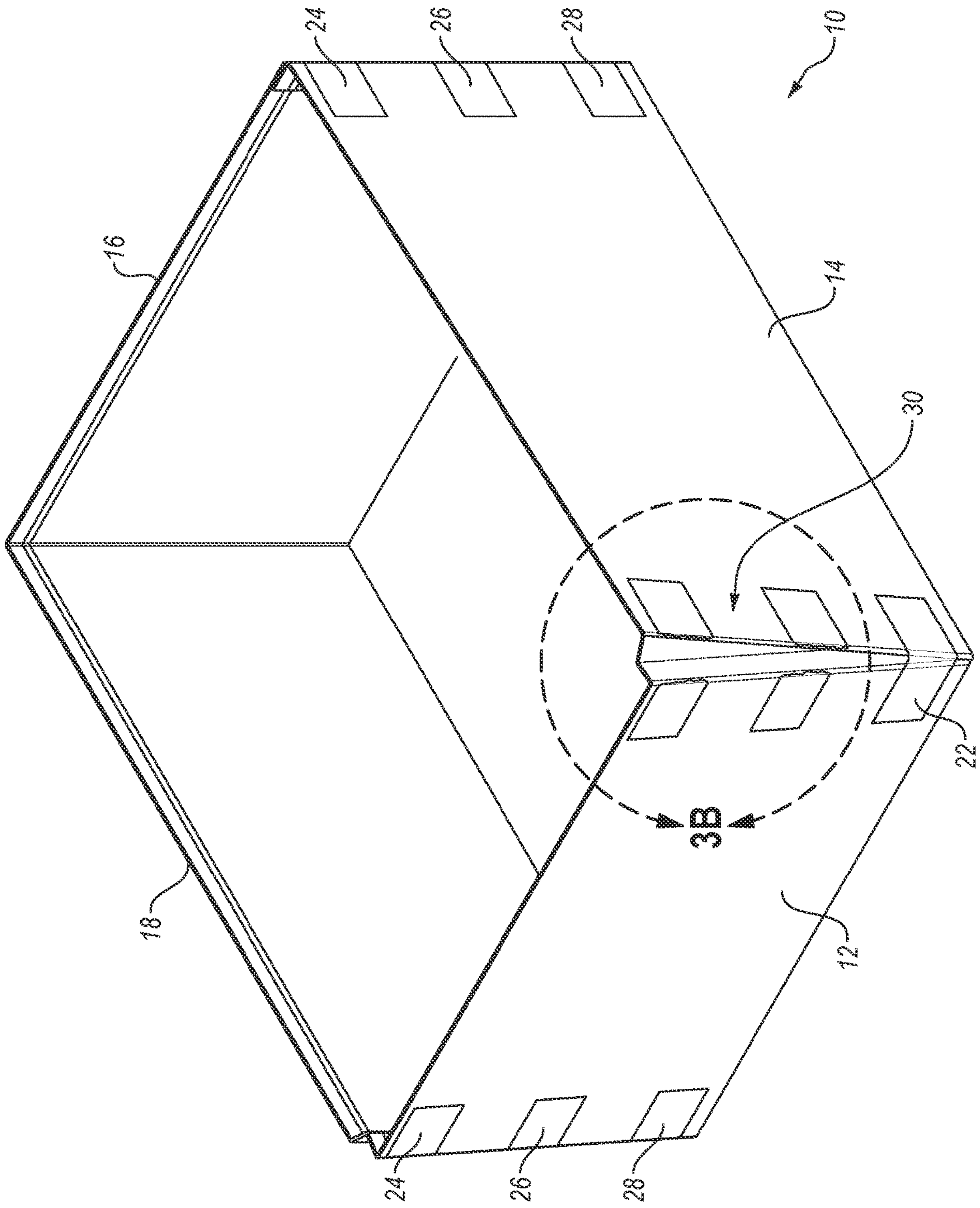
FIG. 2B is an upper perspective view of the exemplary container shown in FIG. 2A, illustrating a portion the container in a second position and/or second configuration, such as a use, display, and/or unloading position and/or configuration.

As shown in FIGS. 1A-1C, one or more chairs 20 may be disposed in the container 10. The chairs 20 may be foldable or folding chairs in which the chairs are movable between a use position and a storage or collapsed position. In the storage or collapsed position, the chair seat, chair back, and/or chair frame may be generally aligned. In particular, as seen in the accompanying figures, the chair seat, chair back, and chair frame may be generally vertically aligned, which may facilitate placement of the chairs within the container 10. After reviewing this disclosure, it will be appreciated that the chairs 20 may have other suitable shapes, sizes, configurations, and/or arrangements.

As shown in the accompanying figures, the chairs 20 may be generally vertically aligned and the chairs may be arranged into two generally parallel rows. In an exemplary embodiment, thirty-eight (38) chairs 20 may be disposed in the container 10. Previously, only thirty-six (36) chairs 20 could be disposed in a container of the same size because otherwise the chairs were very difficult or almost impossible to remove. The chairs 20 were very difficult or almost impossible to remove because the adjacent chairs were in contact and/or a portion of the chairs may overlap and/or interlock. In particular, a portion of the adjacent chairs 20 were often intertwined and/or entangled, which made the chairs remarkably arduous and challenging to remove, especially when the container was full or almost full.

In greater detail, previous containers required extra space or volume to allow the chairs 20 to be removed from the container. For example, the extra space or volume was needed to allow individual chairs or groups of chairs to be removed from the container. Without the extra space or volume, it was very difficult or almost impossible to remove a single chair or a group of chairs from the container. The inability to remove individual chairs or a couple of chairs from the container limited the number of chairs that could be placed in the container. As described in more detail below, the container 10 may advantageously allow individual chairs or groups of chairs to be quickly and easily removed from the container.

Advantageously, the container 10 allows two (2) more chairs to be placed inside a container of the same size, which now allows thirty-eight (38) chairs to be shipped, transported, and/or stored within the container rather than the previous thirty-six (36). Significantly, the container 10 not only allows more chairs to be disposed inside the container, the container also allows the chairs to be quickly and efficiently unloaded and/or removed from the container, and the chairs can be displayed within the container.

Shipping and transport costs may be decreased because additional chairs 20 may be placed inside the container 10 in comparison to previous boxes of the same size. Specifically, the exemplary container 10 may contain thirty-eight (38) chairs 20 rather than the thirty-six (36) chairs that were previously placed in the same-sized container. Thus, approximately five percent (5%) more chairs can be placed inside a container of the same size. Because shipping costs may be primarily based upon volume rather than weight, especially for international shipping, the increased number of chairs inside the container 10 may result in significant costs savings. The additional chairs 20 in the same sized packaging may allow a retailer or merchant to display additional items for sale in the same sized area and that may facilitate sales, decrease restocking costs, provide a more efficient use of space, and provide other benefits.

The container 10 may allow products, such as the chairs 20, to be shipped, transported, displayed, offered for sale, and/or sold to consumers without requiring the chairs to be removed from the container. For example, some sellers, such as retailers or wholesalers, may receive the chairs 20 from the manufacturer in the container 10. These retailers may place the container 10 in a location so that consumers or potential purchasers can retrieve or directly take the chairs 20 from the container 10. In these exemplary circumstances, it may be desirable for the consumer to easily remove a chair 20 or several chairs from the container 10. As discussed below, the container 10 may facilitate removal of one or more chairs 20 from the container by one or more expandable portions.

As shown in the accompanying figures, one or more pieces of tape 22 may be attached to the container 10. For example, one or more pieces of tape 22 may be attached to one or more corners and the tape may be used to help secure and/or maintain the container 10 in the desired configuration. For instance, the exemplary container 10 may include four (4) corners and the tape 22 may be used to help hold or maintain the container 10 in a generally square and/or rectangular configuration. In addition, the tape 22 may reinforce a portion of the container 10, such as the corners. As shown in FIG. 1A, one or more pieces of tape 22 may be attached to one or more corners of the container 10. For example, three pieces of tape 22 may be attached to each corner of the container 10. In particular, a first piece 24 of tape 22 may be attached to an exemplary corner of the container 10; a second piece 26 of tape may be attached to the exemplary corner of the container, and a third piece 28 of tape may be attached to the exemplary corner of the container. As shown in the accompanying figures, the first piece 24 of tape 22 may be attached to an upper portion of the container 10, the second piece 26 of tape may be attached to a middle portion of the container, and the third piece 28 of tape may be attached to a lower portion of the container. It will be appreciated that the pieces of tape 24, 26, and/or 28 may be attached to any suitable portions of the container 10 and the tape 22 may be attached to one or more of the corners or other portions of the container.

The tape 22 may help maintain the container 10 in the desired configuration during shipping, transport, and/or storage. One or more pieces of tape 22 may be intended to break or be cut, which may facilitate removal of the chairs 20 from the container 10. After reviewing this disclosure, one of ordinary skill in the art will appreciate that any suitable number pieces of tape 22 may be used and the tape may be attached to any desired positions of the container 10. The tape 22, and/or the pieces of tape 24, 26, and 28, may not be required.

As shown in FIG. 1A, when the container 10 is filled with the chairs 20, it may be difficult to remove one or more chairs. Specifically, because the chairs 20 may be disposed in the container 10 with little or no extra room or space, and a portion of adjacent chairs may overlap, interfere, and/or interlock, the chairs may be difficult to remove from the container. In addition, it may be difficult to separate or detach adjacent chairs 20 if a portion of the chairs overlap, interfere, and/or interlock. It may also be difficult to remove one or more chairs from the container 10 if something is located above the container, such as a shelf. For example, if the container 10 is placed on a shelf or a rack, another shelf or ledge may be located above the container, and that may prevent or make it quite difficult to remove one or more chairs 20 from the container 10.

In an exemplary embodiment, the container 10 may include one or more portions that may be readily expandable and/or moveable, which may allow the size of the container to increased and/or the configuration of the container to be changed. For example, the container 10 may include one or more expandable portions 30. As shown in FIG. 1B, one or more of the expandable portions 30 may be disposed in one or more corners of the container 10. Advantageously, the expandable portions 30 may allow a portion of the container 10 to expand, enlarge, and/or be disposed at an angle. For instance, the expandable portions 30 may allow a portion of the container 10, such as the front wall 12, to move. In this exemplary embodiment, at least a portion of the front wall 12 may move away from and/or may be disposed at an angled position relative to other portions of the container 10. The expandable portions 30 may allow at least a portion the front wall 12 to be disposed at an angle, such as about ten degrees (10°), about twenty degrees (20°), about thirty degrees (30°), about forty degrees (40°), about fifty degrees (50°), about sixty degrees (60°), or more from a vertical configuration. In the expanded configuration, the chairs 20 may be quickly and/or easily removed from the container 10. For example, if the front wall 12 is disposed at an angle, then one or more chairs 20 may be removed from the container 10 at an angle, which may allow quick and easy removal of the chairs. If the front wall 12 is disposed at an angle, the remaining chairs 20 in the container 10 may also be disposed at an angle. This may, for example, facilitate a consumer reaching a chair 20 disposed within the container 10, removing a chair from the container, and/or providing greater access to chairs disposed towards a rear portion of the container.

The expandable portions 30 may also allow a portion of the container 10 to be spaced apart from other portions of the container. For example, the expandable portions 30 may allow an upper portion of the front wall 12 to be spaced apart from the sides 14, 16 of the container 10. In an exemplary embodiment, the expandable portions 30 may allow the upper portion of the front wall 12 to be spaced part from the sides 14, 16 of the container 10 by about one-half inch or more, about one inch or more, about two inches or more, about three inches or more, about four inches or more, about five inches or more, about six inches or more, etc.

The container 10 may have a smaller size when the expandable portions 30 are in the non-expanded configuration and a larger size when the expandable portions are in the expanded configuration. Thus, the container 10 may have a first size in a first configuration and a second size in a second configuration. The first size and/or configuration of the container 10 may be smaller the second size and/or second configuration.

As shown in FIG. 1B, one or more pieces of tape 22 may be cut or broken when the expandable portions 30 are disposed in the expanded position. For example, if a corner includes three pieces of tape 22, the top two pieces of tape (e.g., the first piece 24 and the second piece 26 of tape) may be cut or broken and the expandable portion 30 may expand. The bottom piece of tape 22 (e.g., the third piece 28 of tape), however, may remain unbroken. In another exemplary embodiment, one piece of tape 22 (e.g., the first piece 24 of tape) may be cut or broken and the other pieces of tape (e.g., the second piece 26 and the third piece 28 of tape) may be unbroken. In still another exemplary embodiment, all the pieces of tape 22 (e.g., the first piece 24, the second piece 26, and the third piece 28 of tape) may be broken. One of ordinary skill in the art will appreciate after reviewing this disclosure that any suitable number and size of pieces of tape 22 may be used and any appropriate number of pieces of tape may be cut or broken. One of ordinary skill in the art after reviewing this disclose will also appreciate that the tape 22 may not be required and other suitable structures and devices may be used such as connectors, fasteners, cords, stretchable cords, hook-and-loop fasteners, and the like.

The number, size, shape, configuration and/or arrangement of the tape 22 and/or the pieces of tape 24, 26, and 28 may allow the container 10 to maintain its desired shape during shipping, transport, and/or storage. The tape 22 and/or the pieces of tape 24, 26, and 28 may be cut or broken, and the one or more expandable portions 30 may expand when it is desired to unload one or more chairs 20. Advantageously, the tape 22 and/or the one or more pieces of tape, such as the pieces of tape 24, 26, and 28, may be relatively easy cut or broken by a retailer or consumer when it is desired to remove one or more chairs 20 from the container 10. It will also be appreciated that the tape 22 and/or one or more pieces of tape, such as the pieces of tape 24, 26, and 28, may be sized, shaped, configured, and/or arranged so that one or more desired pieces of tape may break or may be readily cut in a particular situation. For example, if the upper portion or top of the container 10 is removed, an upper portion of the chairs 20 may be exposed. The removal of the top of the container 10 may also allow a force, such as the weight of one or more chairs 20, to be applied to one or more pieces of the tape 22, such as the pieces of tape 24, 26, and 28. If desired, the tape 22 and/or the one or more pieces of tape, such as the pieces of tape 24, 26, and 28, may be intended to break and/or be more easily cut or broken if additional force is applied, such as by a retailer or consumer.

As shown in FIG. 1C, an individual chair 20 may be easily removed from the container 10 when the expanded portion 30 is disposed in the expanded position. The other portions of the container 10, however, may retain its original shape. For example, the first piece 24 of tape 22 and the second piece 26 of tape in the corner proximate the chair 20 to be removed from the container 10 may be cut or broken, and the third piece of tape 28 may not be cut or broken. Thus, the expandable portion 30 in this corner of the container 10 may expand. The tape 22 in the other corners, however, may not be cut or broken such that the other portions of the container 10 maintains its original shape. After reviewing this disclosure, one of ordinary skill in the art will appreciate that any suitable number and pieces of tape 22 may be cut or broken. For example, the first piece 24 of tape 22 attached to the front 12 and the right side 14 of the container 10 may be cut or broken, and the first piece of tape attached to the front and the left side 18 may be cut or broken. That may allow, for example, an upper portion of the front 12 of the container 10 to be disposed at an angle and/or spaced apart from the sides 14, 18 of the container. In addition, the first and second pieces 24, 26 of tape 22 attached to the front 12 and the right side 14 of the container 10 may be cut or broken, and the first and second pieces of tape attached to the front and the left side 18 of the container may be cut or broken. This may allow an upper portion of the front 12 of the container 10 to be disposed at an angle and/or spaced apart from the sides 14, 18 of the container. Further, the first, second, and third pieces 24, 26, and 28 of tape 22 attached to the front 12 and the right side 14 of the container 10 may be cut or broken, and the first, second, and third pieces of tape attached to the front and the left side 18 of the container may be cut or broken. This may allow the front 12 of the container 10 to be disposed at an angle and/or spaced apart from the sides 14, 18 of the container. After reviewing this disclosure, one of ordinary skill in the art will appreciate that the expandable portions 30 may be disposed in one or more suitable portions of the container 10. For example, in an exemplary embodiment, the expandable portions 30 may be disposed in each corner of the container 10. In another exemplary embodiment, the expandable portions 30 may be disposed in one or more corners of the container 10.

Figure 3A:
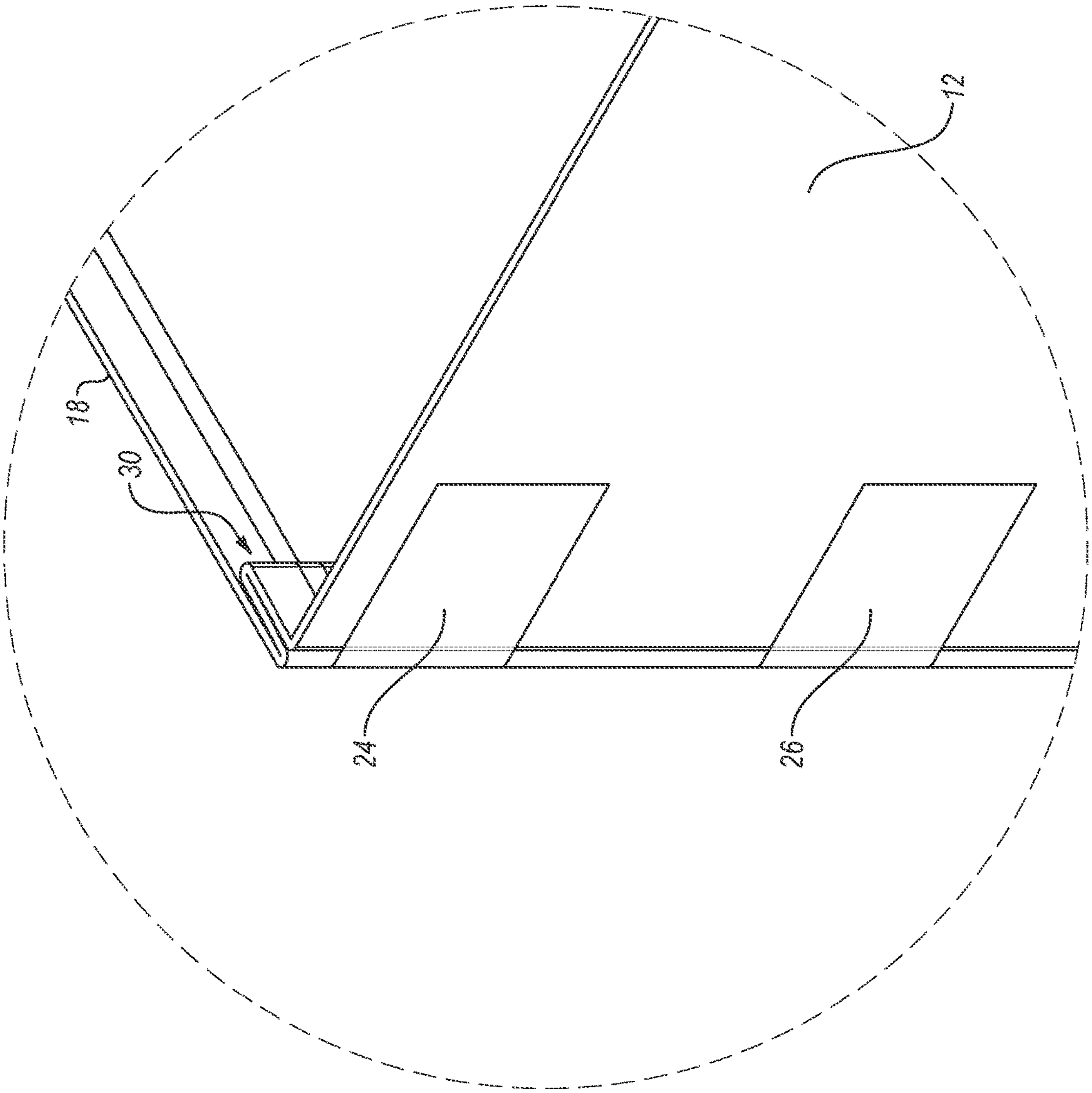
FIG. 3A is an enlarged perspective view of a portion of the exemplary container shown in FIG. 2A.
Figure 4A:
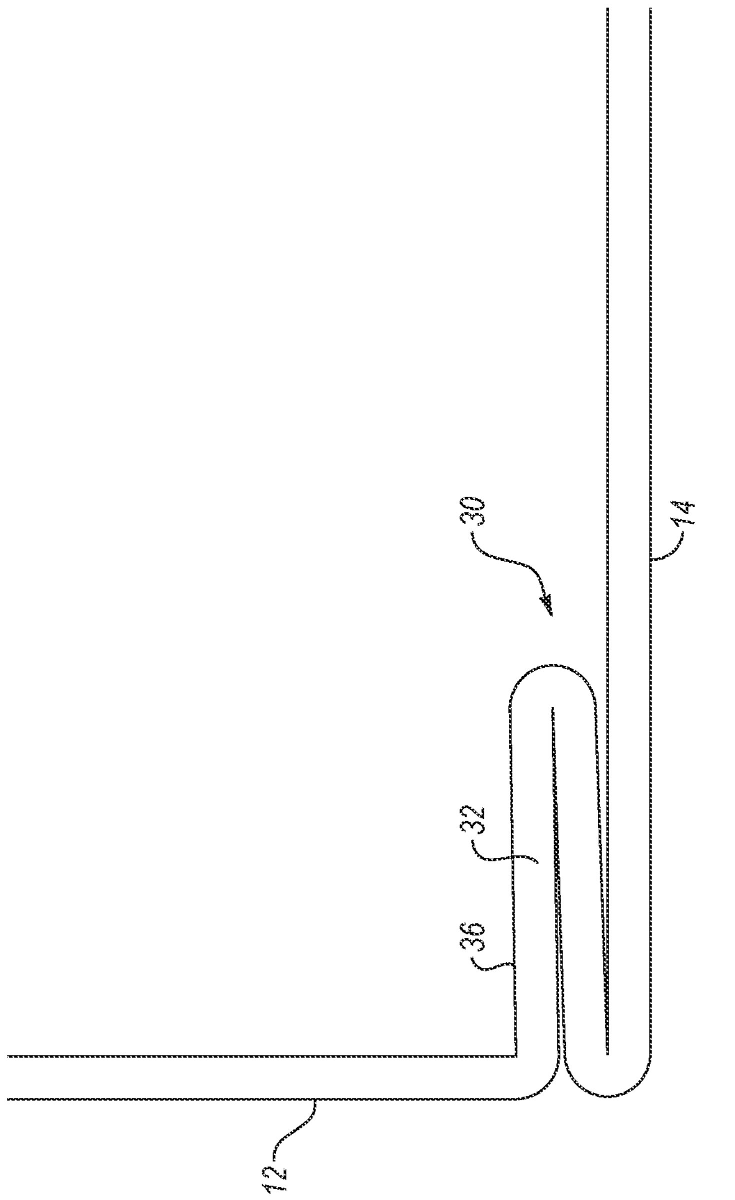
FIG. 4A is a top view of a portion of an exemplary container, illustrating an exemplary expandable portion in a folded or collapsed position.

As shown in FIGS. 2A, 3A, and 4A, an exemplary embodiment of the expandable portion 30 may include a folded or gathered portion, such as a pleated portion, in which a portion of the container is bent over upon itself. In particular, a portion of an outer wall of the container 10 may be bent and/or folded to form the expandable portion 30, and the expandable portion may be disposed in a compact configuration. As shown in the drawings, the expandable portion 30 may extend from an upper portion of the container 10 to a lower portion of the container. The expandable portion 30 may have a generally constant size and/or configuration. The expandable portion 30 may also be tapered. For example, the expandable portion 30 may be tapered from the upper portion of the container towards the lower portion of the container. In addition, the size and configuration of the expandable portion 30 may vary depending, for example, upon the intended size of the expandable portion in the expended position. After reviewing this disclosure, one of ordinary skill in the art will appreciate that the expandable portion 30 may have other suitable shapes, sizes, configurations, and/or arrangements depending, for example, upon the intended use of the container 10.

As shown in the accompanying figures, the expandable portion 30 may include a first portion 32 and the first portion may include a first surface 34 and a second surface 36. The expandable portion 30 may also include a second portion 38 and the second portion may include a first surface 40 and a second surface 42. The first surface 34 of the first portion 32 may be disposed at least proximate the first surface 40 of the second portion 38 when the expandable portion 30 is disposed in the non-expanded position. The first surface 34 of the first portion 32 may be spaced apart from the first surface 40 of the second portion 38 when the expandable portion 30 is disposed in the expanded position.

The expandable portion 30 may be generally aligned with a side or wall of the container 10, such as the right sidewall 14 or the left sidewall 18, or end of the container, such as the front end 12 or the rear end 16. For example, as seen in FIG. 3A, the expandable portion 30 may be generally aligned with an outer wall of the container, such as the left sidewall 18. In addition, as seen in FIG. 4A, the expandable portion 30 may be generally aligned with the right sidewall 14. After reviewing this disclosure, one of ordinary skill in the art will appreciate that the expandable portion 30 may be aligned with any suitable portion of the container 10. After reviewing this disclosure, one of ordinary skill in the art will also appreciate that the expandable portions 30 do not have to be aligned with any portions of the container 10 and, for example, the expandable portions may be disposed at an angle relative to other portions of the container.

The expandable portion 30 may be secured in the folded or collapsed position, if desired. For example, an adhesive or glue may help maintain the expandable portion 30 in the folded, closed, or collapsed position. The adhesive may be a relatively weak adhesive that allows the expandable portion 30 to expand when desired. One of ordinary skill in the art will appreciate after reviewing this disclosure that the expandable portion 30 may have other suitable shapes, sizes, configurations, and/or arrangements. For example, the extendable portion 30 may include two or more folds, may be constructed from an elastic or flexible material, may have different sizes depending upon the desired amount of expansion, and/or may have different lengths and/or widths depending, for example, upon the intended use of the container 10.

As shown in FIG. 2B, the container 10 may include two expandable portions 30 and the expandable portions may be disposed in two corners of the container. The expandable portions 30 may allow at least a portion of the container, such as the front wall 12, to be spaced apart and/or disposed at an angle relative to the other portions of the container 10. As shown in the accompanying figures, the expandable portions 30 may create a larger opening and/or a larger size container 10. The expandable portion 30 may allow a portion of the container 10 to extend outwardly, such as an upper portion of the front wall 12. One of ordinary skill in the art after reviewing this disclosure will appreciate that the expandable portions 30 may be disposed in other locations, depending, for example, upon the intended use of the container 10.

As shown in FIG. 3A, when the container 10 is in a shipping, transport, and/or storage configuration, the expandable portion 30 may be in a closed, collapsed, folded, or first position or configuration. The expandable portion 30 may be secured in the collapsed position by one or more suitable structures or devices such as fasteners, connectors, cords, elastic members, adhesives, and/or the tape 22 (including, for example, the first piece 24, the second piece 26, and/or the third piece 28 of tape). For example, if an adhesive is used, the adhesive may be sized and configured to hold the expandable portion 30 in the collapsed position during shipping, transport, and/or storage. The adhesive may be sized and configured to release the expandable portion 30 when it is desired to remove one or more items from the container 10, such as a chair 20. For instance, if one or more pieces of tape 22 (e.g., the first piece 24, the second piece 26, and/or the third piece 28 of tape) are cut or broken and/or a force is applied to the expandable portion 30, then the expandable portion may expand. Advantageously, because the expandable portion 30 may be relatively small and may be aligned with an inner surface of the container 10, the expandable portion may not require significant space within the container and the expandable portion may not hinder placement of items within the container.

Figure 3B:
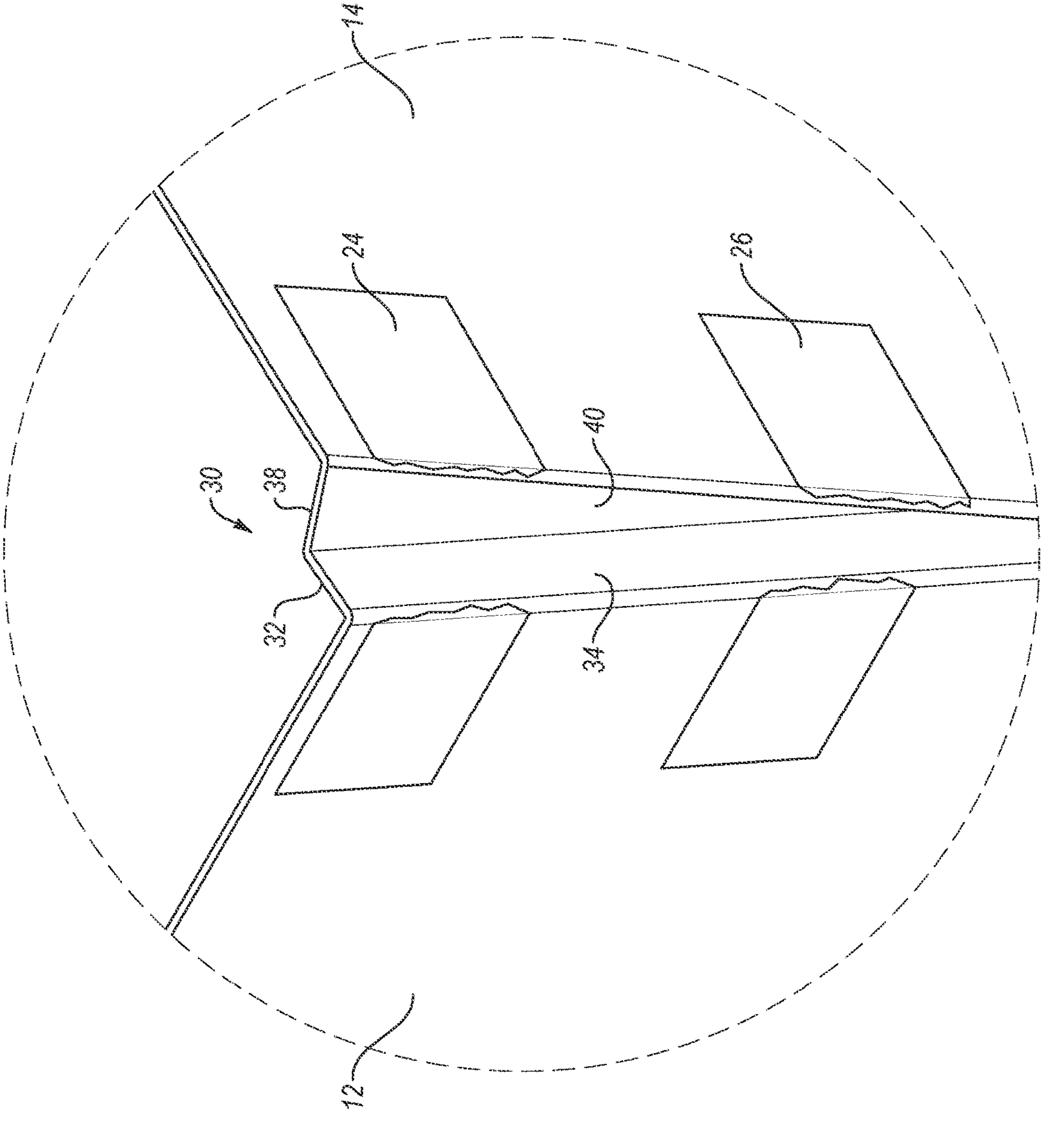
FIG. 3B is an enlarged perspective view of a portion of the exemplary container shown in FIG. 2B.

As shown in FIG. 3B, the expandable portion 30 may expand and that may allow a portion of the container 10 to increase in size and/or be disposed at an angle. In an exemplary embodiment, the expandable portion 30 may allow the upper portion of the container 10 to expand about one inch, about two inches, about three inches, about four inches, about five inches, about six inches, or more. While the accompanying figures illustrate the upper portion of the container 10 expanding more than the lower portion of the container, it will be understood that the expendable portions may expand any desired amount.

As shown in FIG. 4A, a folded portion of an outer wall of the container 10 may form at least a portion of the expandable portion 30. In an exemplary embodiment, the expandable portion 30 may include the first portion 32 and the second portion 38, and the first and second portions may be folded together such that the first surface 34 of the first portion contacts or abut the first surface 40 of the second portion 38. The first and second folded portions 32, 38 may be held together by an adhesive, if desired, and the folded portions may be attached to an inner surface of the container 10. It will be appreciated that the expandable portions 30 may be larger or smaller depending, for example, upon the intended use of the container 10. It will also be appreciated that the expandable portions 30 may be disposed in other suitable locations, such as an outer portion of the container 10, and the expandable portions may have other shapes, sizes, configurations, and/or arrangements depending, for example, upon the items disposed in the container.

Figure 4B:
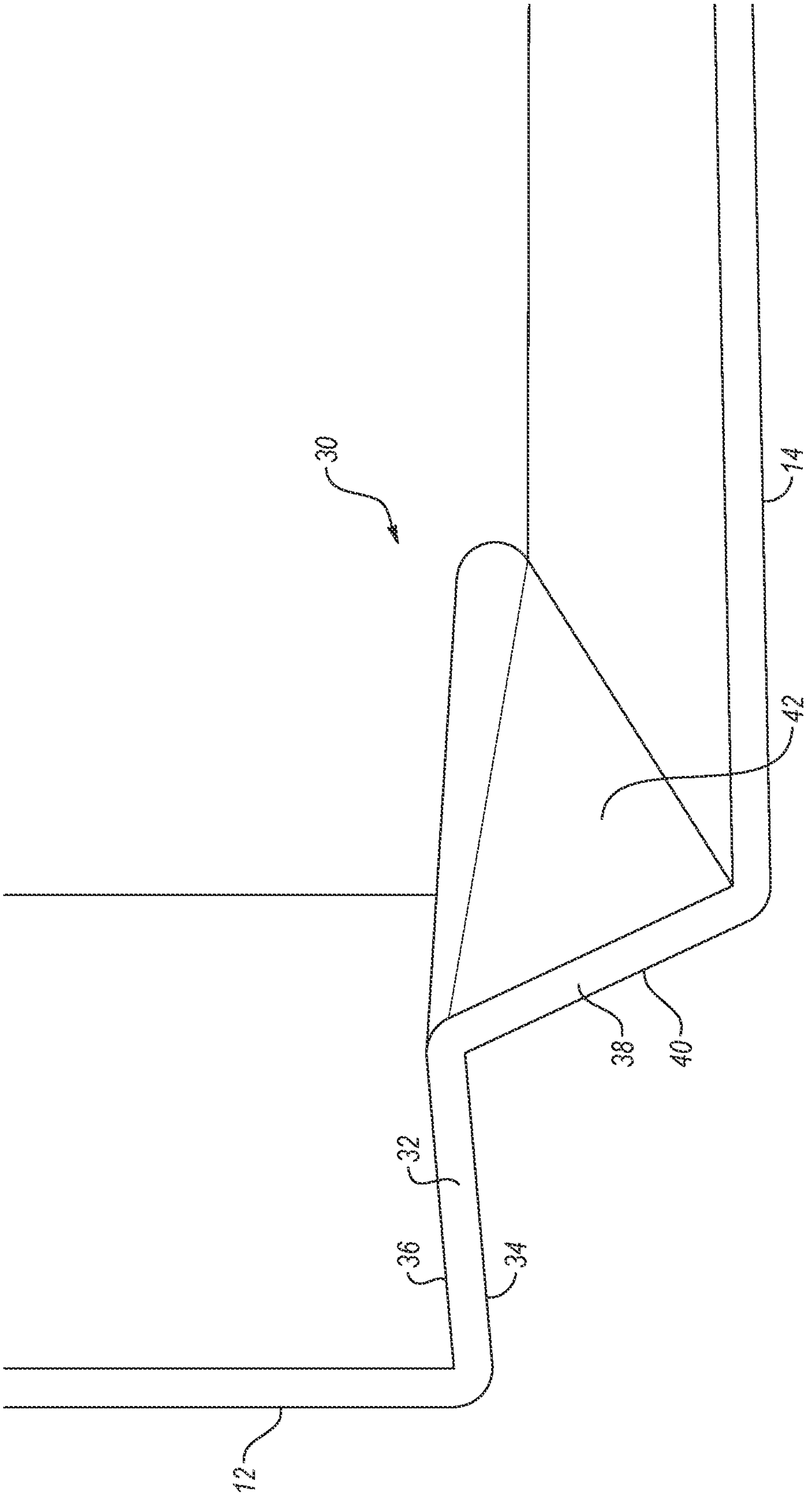
FIG. 4B is top view of a portion of an exemplary container, illustrating an exemplary expandable portion in an unfolded or open position.

As shown in FIG. 4B, when the expandable portion 30 is disposed in the open or expanded position, the expandable portion may be unfolded and a portion of the container, such as the front 12, may now be spaced apart and/or disposed at an angle. This may facilitate removal of items from the container 10.

As mentioned above, the container 10 may be a cardboard box and the cardboard box may be at least primarily constructed from recycled materials, such as paper. The cardboard may include a flute that is sandwiched between two liners. The flute may be a ribbed or curved piece that is disposed between the liners, and the flute may increase the strength of the container 10. The flute may also help protect the contents of the container 10 from damage. The liners, which may be referred to as an inner liner and an outer liner, may be treated to be water resistant, facilitate printing, etc. Depending upon the intended use of the container 10, the container may be constructed to have high tear resistance and/or high burst resistance. The container 10 may be constructed with a single wall, a double wall, and the like. It will be appreciated, after reviewing this disclosure, that the container 10 could have various shapes, sizes, configurations, and/or arrangements depending, for example, upon the intended use of the container.

The expandable portion 30 may be constructed from the same material as the container 10, such as cardboard. The expandable portion 30 may also be integrally formed with the container 10 as part of a unitary, one-piece structure. The expandable portion 30, however, could be constructed from different materials, and the expandable portion may be a separate structure.

In an exemplary embodiment, the container 10 may be constructed using one or more machines or tools. For example, a machine or tool may be used to cut or trim one or more sheets of material to the desired size. In particular, a machine or tool may be used to cut one or more sheets of material, such as cardboard, into the appropriate size. A machine or tool may also be used to bend and fold the sheets of material, such as cardboard, into the desired shape. A machine may also be used to secure the container 10 in the desired configuration. For example, an adhesive or glue may be used to secure the container 10 into the desired configuration. Staples, stitching, connectors, fasteners, and the like may also be used to secure the container 10 in the desired configuration. If desired, one or more pieces of tape 22 (e.g., the first piece 24, the second piece 26, and/or the third piece 28 of tape) may be used to attached to the container 10 in one or more desired locations. Advantageously, a machine or tool may be used to create the expandable portions 30, which may facilitate manufacturing of the container 10. One of ordinary skill in the art will appreciate after reviewing this disclosure that the container 10 and the expandable portion 30 may be created by other suitable processes or methods.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A container movable between a first configuration and a second configuration, the first configuration sized and configured to retain one or more items within the container, the second configuration sized and configured to facilitate removal of one or more items from the container, the first configuration having a smaller size than the second configuration, the container comprising:

- a first outer wall;
- a second outer wall;
- a first corner disposed at least proximate an intersection of the first outer wall and the second outer wall;
- a first expandable portion disposed in the first corner, the first expandable portion movable between a collapsed position and an expanded position, the first expandable portion comprising:
  - a first portion integrally connected to the first outer wall;
  - a second portion integrally connected to the second outer wall;
  - a first surface of the first portion abutting a first surface of the second portion when the first expandable portion is disposed in a collapsed position, the first surface of the first portion at least partially spaced apart from the first surface of the second portion when the first expandable portion is disposed in the expanded position; and
  - a second surface of the second portion abutting an inner surface of the second outer wall when the first expandable portion is disposed in the collapsed position, the second surface of the second portion at least partially spaced apart from the inner surface of the first outer wall when the first expandable portion is disposed in the expanded position;
- wherein the first expandable portion allows the first outer wall of the container to move from a first position to a second position when the first expandable portion moves from the collapsed position to the expanded position;
- a first connector disposed at least proximate an upper portion of the first corner, the first connector releasably securing the first expandable portion in the collapsed position; and
- a second connector disposed below the first connector in the first corner, the second connector releasably securing the first expandable portion in the collapsed position, the first connector and the second connector being independently releasable;
- wherein when the first connector is released, the first expandable portion expands a first amount; and
- wherein when the second connector is released, the first expandable portion expands a second amount, the second amount being larger than the first amount.

2. The container as in claim 1, wherein the first expandable portion is connected to the inner surface of the second outer wall when the first expandable portion is disposed in the collapsed position.

3. The container as in claim 1, wherein the first outer wall is disposed in a generally vertical configuration when the first expandable portion is in the collapsed position;

- wherein the first outer wall is disposed at a first outwardly extending angle when the first connector is released; and
- wherein the first outer wall is disposed at a second outwardly extending angle when the second connector is released, the second outwardly extending angle being larger than the first outwardly extending angle.

4. The container as in claim 1, wherein an upper portion of the first outer wall is disposed at least adjacent to an upper portion of the second outer wall when the first expandable portion is in the collapsed position; and wherein the upper portion of the first outer wall is spaced apart from the upper portion of the second outer wall when the first expandable portion is in the expanded position.

5. The container as in claim 1, wherein the first outer wall, the second outer wall, and the first expandable portion are integrally formed as part of a unitary, one-piece structure.

6. The container as in claim 1, wherein the first portion of the first expandable portion is at least partially constructed from the first outer wall; and wherein the second portion of the first expandable portion is at least partially constructed from the second outer wall.

7. The container as in claim 1, wherein the first portion of the first expandable portion is at least partially constructed from the first outer wall; and wherein the second portion of the first expandable portion is at least partially constructed from the first outer wall.

8. The container as in claim 1, wherein the first portion of the first expandable portion is at least partially constructed from the second outer wall; and wherein the second portion of the first expandable portion is at least partially constructed from the second outer wall.

9. The container as in claim 1, wherein the first connector is a first piece of tape attached to the first outer wall and the second outer wall, the first piece of tape extending around the first corner; and wherein the second connector is a second piece of tape attached to the first outer wall and the second outer wall, the second piece of tape extending around the first corner;

wherein, when the first piece of tape is cut, the first expandable portion may move from the collapsed position to the expanded position; and where, when the second piece of tape is cut, the first expandable portion may move to a second expanded position, the second expanded position being larger than the first expanded position.

10. The container as in claim 9, wherein the second piece of tape remains uncut when the first expandable portion moves from the collapsed position to the expanded position.

11. The container as in claim 1, further comprising:

wherein the first connector is a first piece of tape attached to the first outer wall and the second outer wall, the first piece of tape extending around the first corner;

wherein the second connector is a second piece of tape attached to the first outer wall and the second outer wall, the second piece of tape extending around the first corner; and further comprising a third piece of tape attached to the first outer wall and the second outer wall, the third piece of tape disposed below the second piece of tape and extending around the first corner;

wherein, when the first piece of tape is cut, the first expandable portion may move from the collapsed position to a first expanded position;

wherein, when the second piece of tape is cut, the first expandable portion may move to a second expended position, the second expanded position being larger than the first expanded position; and wherein, when the third piece of tape is cut, the first expandable portion may move to a third expanded position, the third expanded position being larger than the second expanded position.

12. The container as in claim 11, wherein the third piece of tape remains uncut when the first expandable portion moves from the first expanded position to the second expanded position.

13. The container as in claim 1, wherein the first portion of the first expandable portion and the second portion of the first expandable portion comprise a portion the first outer wall folded onto itself.

14. The container as in claim 1, wherein the first portion of the first expandable portion and the second portion of the first expandable portion comprise a portion the second outer wall folded onto itself.

15. The container as in claim 1, further comprising:

a third outer wall;

a second corner disposed at least proximate an intersection of the first outer wall and the third outer wall; and a second expandable portion disposed in the second corner, the second expandable portion movable between a collapsed position and an expanded position, the second expandable portion comprising:

a first portion integrally connected to the first outer wall;

a second portion integrally connected to the third outer wall;

a first surface of the first portion abutting a first surface of the second portion when the second expandable portion is disposed in a collapsed position, the first surface of the first portion spaced apart from the first surface of the second portion when the second expandable portion is disposed in the expanded position; and a second surface of the second portion abutting an inner surface of the third outer wall when the second expandable portion is disposed in the collapsed position, the second surface of the second portion spaced apart from the inner surface of the third outer wall when the second expandable portion is disposed in the expanded position;

wherein the second expandable portion allows the first outer wall of the container to move from the first position to the second position when the second expandable portion moves from the collapsed position to the expanded position;

a first connector disposed in an upper portion of the second corner, the first connector releasably securing the second expandable portion in the collapsed position; and a second connector disposed below the first connector in the second corner, the second connector releasably securing the second expandable portion in the collapsed position;

wherein when the first connector in the second corner is released, the second expandable portion expands a first amount; and wherein when the second connector in the second corner is released, the second expandable portion expands a second amount, the second amount being larger than the first amount.

16. A method of constructing a container that is movable between a first configuration and a second configuration, the first configuration sized and configured to retain one or more items within the container, the second configuration sized and configured to facilitate removal of one or more items from the container, the first configuration having a smaller size than the second configuration, the method comprising:

providing a first outer wall;

providing a second outer wall;

disposing a first corner at least proximate an intersection of the first outer wall and the second outer wall;

forming a first expandable portion in the first corner, the first expandable portion movable between a collapsed position and an expanded position, the first expandable portion including a first portion integrally connected to the first outer wall, a second portion integrally connected to the second outer wall, a first surface of the first portion abutting a first surface of the second portion when the first expandable portion is disposed in a collapsed position, the first surface of the first portion spaced apart from the first surface of the second portion when the first expandable portion is disposed in the expanded position, the first expandable portion allowing the first outer wall to move from a first position to a second position when the first expandable portion moves from the collapsed position to the expanded position; and contacting a second surface of the second portion of the first expandable portion with an inner surface of the second outer wall when the first expandable portion is disposed in the collapsed position;

disposing a first connector in an upper portion of the first corner, the first connector releasably securing the first expandable portion in the collapsed position;

disposing a second connector below the first connector in the first corner, the second connector releasably securing the first expandable portion in the collapsed position, the first connector and the second connector being independently releasable;

wherein when the first connector is released, the first expandable portion expands a first amount; and wherein when the second connector is released, the first expandable portion expands a second amount, the second amount being larger than the first amount.

17. The method as in claim 16, wherein the first connector is a first piece of tape and comprises attaching the first piece of tape to the first outer wall and the second outer wall, the first piece of tape extending around the first corner; and wherein the second connector is a second piece of tape and comprises attaching the second piece of tape to the first outer wall and the second outer wall, the second piece of tape extending around the first corner;

wherein, when the first piece of tape is cut, the first expandable portion may move from the collapsed position to the expanded position; and wherein, when the second piece of tape is cut, the first expandable portion may move from the first expanded position to a second expanded position, the second expanded position larger than the first expanded position.

18. The method as in claim 17, wherein the second piece of tape remains uncut when the first expandable portion moves from the collapsed position to the expanded position.

19. The method as in claim 16, wherein the first connector is a first piece of tape and comprises attaching the first piece of tape to the first outer wall and the second outer wall, the first piece of tape extending around the first corner;

wherein the second connector is a second piece of tape and comprises attaching the second piece of tape to the first outer wall and the second outer wall, the second piece of tape extending around the first corner; and further comprising attaching a third piece of tape to the first outer wall and the second outer wall, the third piece of tape extending around the first corner;

wherein, when the first piece of tape is cut, the first expandable portion may move from the collapsed position to a first expanded position; and wherein, when the second piece of tape is cut, the first expandable portion may move from the first expanded position to a second expanded position, the second expanded position larger than the first expanded position.

20. The method as in claim 19, wherein the third piece of tape remains uncut when the first expandable portion moves from the collapsed position to the expanded position.

* * * * *